US012725114B2

(12) United States Patent
Henry et al.

(10) Patent No.: US 12,725,114 B2
(45) Date of Patent: Sep. 1, 2026

(54) SYSTEM AND METHOD FOR DETERMINING A LOCATION AND DIRECTION OF TRAVEL OF AN OBJECT TRANSPORT VEHICLE

(71) Applicant: FEDERAL EXPRESS CORPORATION, Memphis, TN (US)

(72) Inventors: Kevin C. Henry, Harrison, AR (US); Bryan M. Crow, Harrison, AR (US); Trenton C. Fox, Harrison, AR (US)

(73) Assignee: Federal Express Corporation, Memphis, TN (US)

( * ) Notice: Subject to any disclaimer, the term of this patent is extended or adjusted under 35 U.S.C. 154(b) by 85 days.

(21) Appl. No.: 18/638,409

(22) Filed: Apr. 17, 2024

(65) Prior Publication Data

US 2025/0328853 A1 Oct. 23, 2025

(51) Int. Cl.

| | |
|---|---|
| ***G06Q 10/0833*** | (2023.01) |
| ***G06Q 10/083*** | (2024.01) |
| ***H04W 4/029*** | (2018.01) |
| ***H04W 4/40*** | (2018.01) |

(52) U.S. Cl.

CPC ..... *G06Q 10/0833* (2013.01); *G06Q 10/0838* (2013.01); *H04W 4/029* (2018.02); *H04W 4/40* (2018.02)

(58) Field of Classification Search

CPC .......... G06Q 10/0833; G06Q 10/0838; H04W 4/029; H04W 4/40

See application file for complete search history.

(56) References Cited

U.S. PATENT DOCUMENTS

2006/0119473 A1 6/2006 Gunderson et al.
2008/0077299 A1* 3/2008 Arshad .................. E02F 9/003 701/50
2020/0226769 A1 7/2020 Das et al.
2020/0406860 A1 12/2020 Mai et al.
2021/0168563 A1* 6/2021 Sanji ...................... E05B 49/00

(Continued)

OTHER PUBLICATIONS

Minglu Li, The Vehicle Tracking System for Analyzing Transportation Vehicle Information, 2006, p. 1012-1020 (Year: 2006).*

(Continued)

*Primary Examiner* — Ibrahim N El-Bathy

(74) *Attorney, Agent, or Firm* — FINNEGAN, HENDERSON, FARABOW, GARRETT & DUNNER, LLP

(57) ABSTRACT

Disclosed are methods, apparatuses, and systems for tracking an object transport vehicle. The method includes calculating a front center point of the object transport vehicle based on first signals received from a first plurality of wireless devices affixed to a front portion of the object transport vehicle. A rear center point of the object transport vehicle is calculated based on second signals received from a second plurality of wireless devices affixed to a rear portion of the object transport vehicle. A location and direction of travel of the object transport vehicle are determined based on the front center point and the rear center point. The location and direction of travel of the object transport vehicle is determined based only on the rear center point, on a condition that the first signals from the first plurality of wireless devices are not received and prerequisites are met.

20 Claims, 10 Drawing Sheets

(56) References Cited

U.S. PATENT DOCUMENTS

| | | | | |
|---|---|---|---|---|
| 2021/0319700 | A1* | 10/2021 | Kang | G08G 1/166 |
| 2022/0017010 | A1* | 1/2022 | Taniguchi | G06F 3/14 |
| 2022/0032955 | A1* | 2/2022 | Xiang | B60W 50/029 |
| 2023/0297936 | A1* | 9/2023 | Paul | G06Q 10/0833<br>705/333 |

OTHER PUBLICATIONS

International Search Report and Written Opinion in counterpart International Application No. PCT/US2025/024663, dated Jun. 26, 2025 (9 pages).

* cited by examiner

900

SYSTEM AND METHOD FOR DETERMINING A LOCATION AND DIRECTION OF TRAVEL OF AN OBJECT TRANSPORT VEHICLE

TECHNICAL FIELD

The present disclosure generally relates to real time location systems. In particular, embodiments of the present disclosure relate to methods, systems, and devices for determining the location and direction of travel of an object transport vehicle when transiting the entrance of a trailer.

BACKGROUND

The efficient, safe, and secure shipment of freight, including but not limited to correspondence, materials, goods, components, and commercial products, is an important component in today's business, particularly in view of the international nature of most business enterprises. Freight often is shipped nationally and internationally by means of several different transportation devices, such as trucks, trains, ships, and airplanes. Before the freight reaches its destination, it is often handled by several different entities, such as truck companies, intermediate consolidators, railways, shipping companies, and airlines.

The parcels of freight may be exchanged between entities at different transfer points or hubs. At each hub, the parcels may be separated and transferred by different vehicles to different destinations. The parcels may be unloaded from a vehicle and then loaded onto another vehicle one or more times.

A wireless device (e.g., a tag) may be affixed to a parcel to help track a location of the parcel during shipment, including while in a hub (e.g., a warehouse). In some instances, the hub may contain many parcels and many trailers that are placed relatively close together. For example, when a trailer is being loaded, the parcels to be loaded onto the trailer may be staged near the trailer entrance prior to loading to expedite the loading process. An object transport vehicle (e.g., a forklift) may be used to load the parcels onto the trailer. The object transport vehicle may have one or more wireless devices affixed thereto, to help track the location of the object transport vehicle in the hub.

Continuing the above example, to further expedite the trailer loading process, the wireless device on each parcel may be "read" to identify the parcel and determine whether the forklift operator should load the "read" parcel onto the trailer. In a hub where there are many trailers spaced close to each other, it may be difficult to determine which trailer that a forklift is entering or exiting. For example, if there are one or more wireless devices on a front of the forklift, wireless signals from those wireless devices may be blocked or interfered with while the front of the forklift is in a trailer (e.g., the structure of the trailer may interfere with the wireless signals transmitted by the wireless devices), making it difficult to determine a precise location of the forklift.

It is therefore desirable to be able to determine a precise location of a given object transport vehicle at a specific point in time. Existing solutions may not provide sufficient accuracy and granularity in crowded environments (e.g., where there any many objects and trailers in a worksite) to correctly determine where in a hub an object transport vehicle is located at a specific point in time.

SUMMARY

According to some embodiments of the present disclosure, there is provided an object transport vehicle tracking system. The system includes a first plurality of wireless devices affixed to a front portion of the object transport vehicle, a second plurality of wireless devices affixed to a rear portion of the object transport vehicle, and a controller. The controller is configured to calculate a front center point of the object transport vehicle based on first signals received from each of the first plurality of wireless devices, calculate a rear center point of the object transport vehicle based on second signals received from each of the second plurality of wireless devices, determine a location and direction of travel of the object transport vehicle based on the front center point and the rear center point, and determine the location and direction of travel of the object transport vehicle based only on the rear center point, on a condition that the first signals from the first plurality of wireless devices are not received and prerequisites are met.

According to some embodiments of the present disclosure, there is provided a method for tracking an object transport vehicle. The method includes calculating a front center point of the object transport vehicle based on first signals received from each of a first plurality of wireless devices, each of the first plurality of wireless devices affixed to a front portion of the object transport vehicle; calculating a rear center point of the object transport vehicle based on second signals received from each of the second plurality of wireless devices, each of the second plurality of wireless devices affixed to a rear portion of the object transport vehicle; determining a location and direction of travel of the object transport vehicle based on the front center point and the rear center point; and determining the location and direction of travel of the object transport vehicle based only on the rear center point, on a condition that the first signals from the first plurality of wireless devices are not received and prerequisites are met.

According to some embodiments of the present disclosure, there is provided an object transport vehicle tracking system. The system includes a first plurality of wireless devices affixed to a front portion of the object transport vehicle, a second plurality of wireless devices affixed to a rear portion of the object transport vehicle, and a controller. The controller is configured to determine a location and direction of travel of the object transport vehicle based on first signals received from each of the first plurality of wireless devices and second signals received from each of the second plurality of wireless devices and determine the location and direction of travel of the object transport vehicle based only on the second signals from the second plurality of wireless devices, on a condition that the first signals from the first plurality of wireless devices are not received and prerequisites are met.

DETAILED DESCRIPTION

Figure 1:
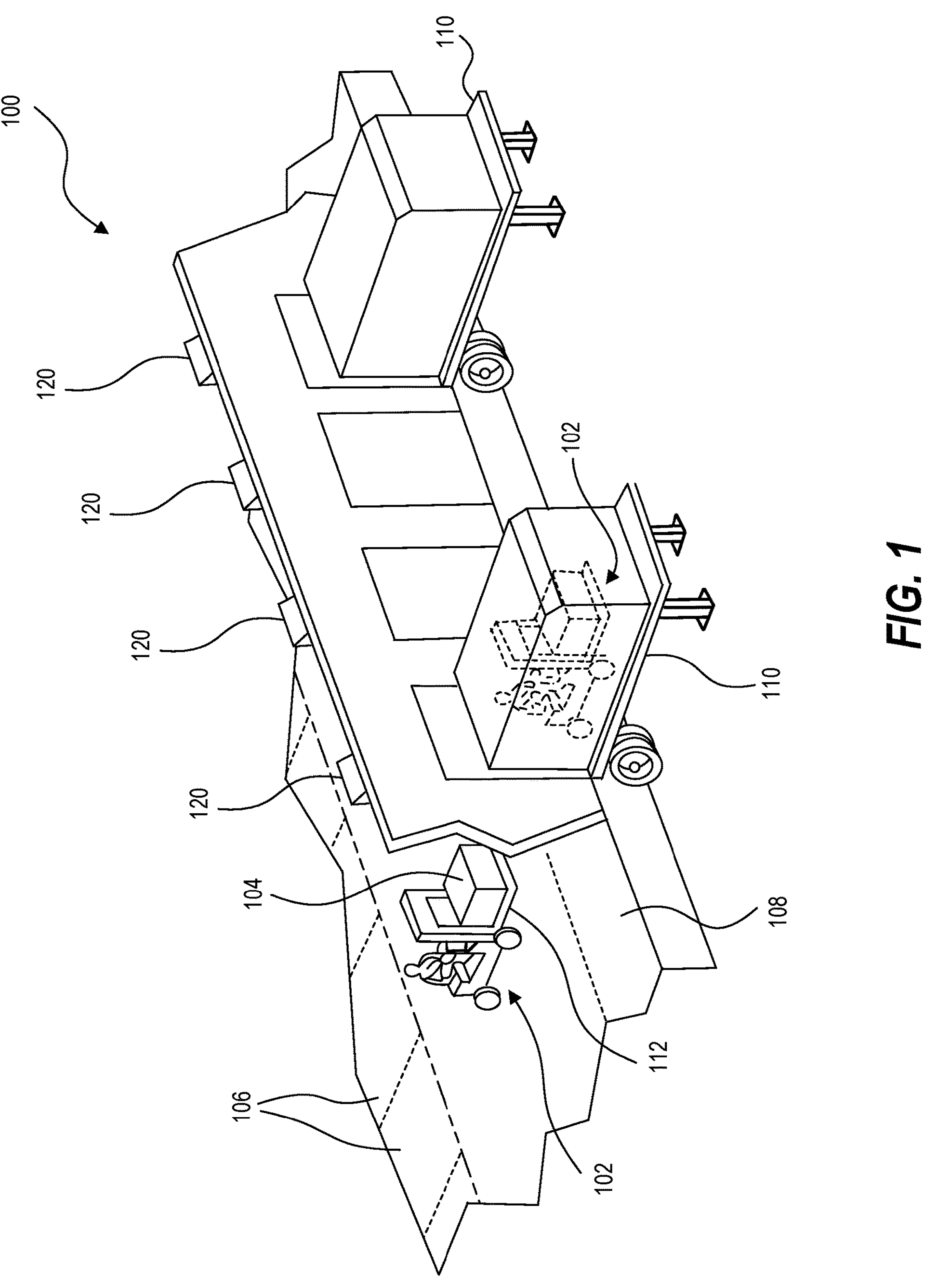
FIG. 1 is a schematic representation of a worksite, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 illustrates a worksite 100, consistent with the disclosed embodiments. The worksite 100 may include one or more areas where one or more vehicles, such as forklifts 102, may load or unload one or more objects, such as shipments 104, packages, or other freight. For example, one forklift 102 may be used to pick up one or more shipments 104 at one location at the worksite 100 and transport the shipment(s) 104 to another location at the worksite 100. It is to be understood, however, that vehicles other than forklifts may be used to transport the shipment(s) 104. For example, other manned, semi-autonomous, or autonomous (unmanned) vehicles may be used to transport the shipment(s) 104, such as hand-trucks, carts, trailers, motor vehicles, or other vehicles. Such vehicles may also be referred to in this disclosure as "object transport vehicles."

The worksite 100 may be at least partially located in a warehouse or other structure or building, as shown in FIG. 1. Alternatively, the worksite 100 may be partially or entirely outdoors. The worksite 100 may include one or more locations or zones where the shipments 104 may be unloaded and stored, either temporarily or for longer periods of time. For example, depending on the layout of the worksite 100, the forklifts 102 may transport the shipments 104 to and from different lanes 106, loading bays, docks 108, or other storage areas, or to and from other vehicles 110 (e.g., trailers, trucks, aircraft, ships, or other delivery vehicles, etc.) at the worksite 100. Although the worksite 100 shown in FIG. 1 includes a warehouse and surrounding area, it is to be understood that the worksite 100 may cover a larger area including multiple buildings.

In an embodiment, the worksite 100 may be a receiving and/or shipping facility, distribution center, or hub where the shipments 104 are received and/or shipped. One or more of the forklifts 102 may transport the shipments 104 within the worksite 100 so that the shipments 104 are loaded into the appropriate delivery vehicles leaving the worksite 100 or loaded into the appropriate storage areas at the worksite 100. Alternatively, it is to be understood that objects other than shipments may be transported and tracked using the systems and methods described below. Other inventory and objects may be tracked, depending on the application. The worksite 100 may include one or more readers 120 configured to receive wireless signals from wireless devices associated with an object transport vehicle (e.g., forklift 102) and an object (e.g., shipment 104), as will be described in further detail below.

The shipments 104 may be placed on and supported by a pallet 112, which may be loaded onto and unloaded from the forklifts 102. Alternatively, the forklifts 102 may include or carry another type of platform or surface on which the shipments 104 may be placed.

Figure 2:
FIG. 2 is a schematic representation of a top view of a forklift carrying a shipment on a pallet, consistent with the disclosed embodiments.
Figure 2:
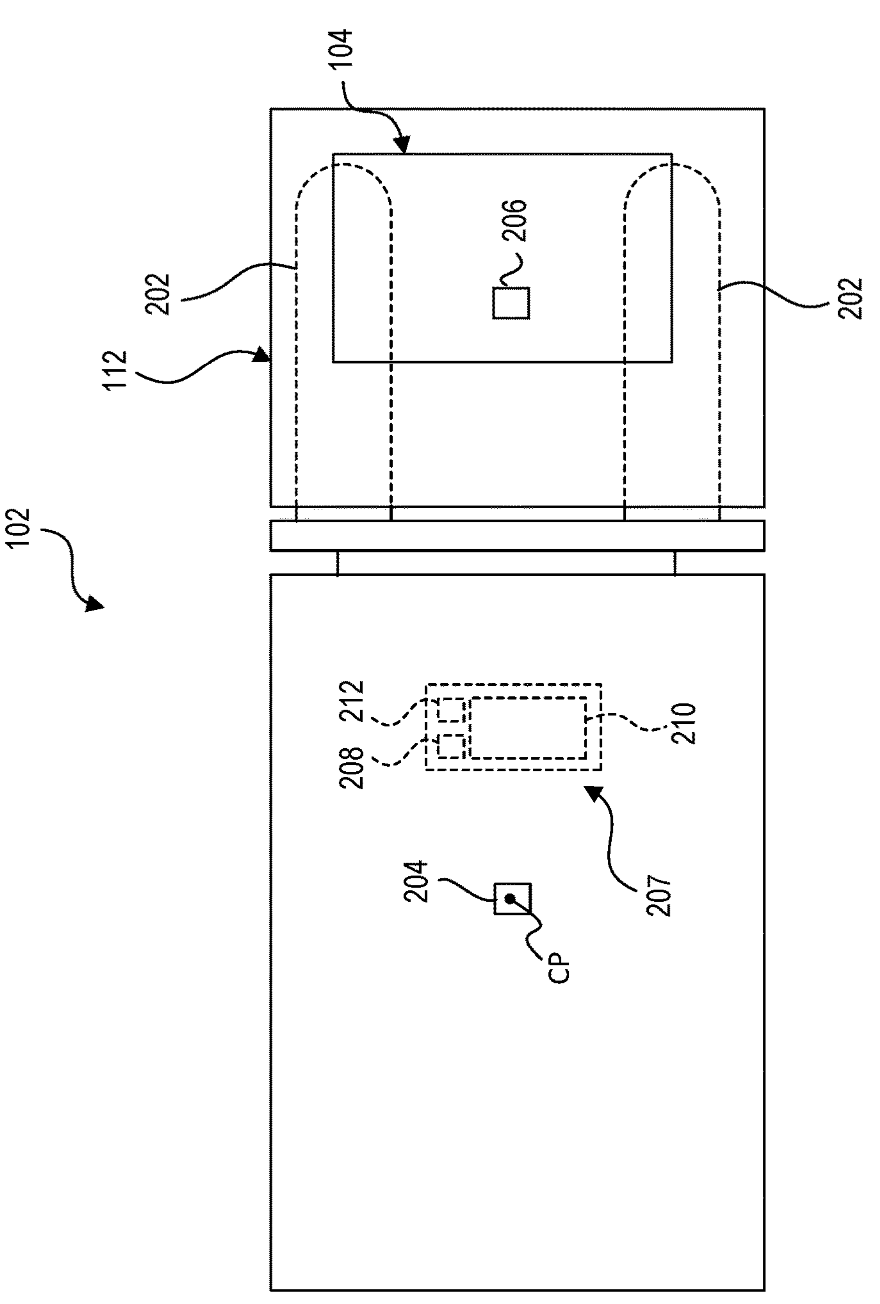

FIG. 2 is a schematic representation of a top view of a forklift 102 carrying the shipment 104 on the pallet 112, consistent with the disclosed embodiments. The forklift 102 may include forks 202 or another implement at a front end of the forklift 102 that engage the pallet 112 or shipment 104. The forklift 102 may also include a lift mechanism for lifting the forks 202 or other implement, thereby lifting the pallet 112 and/or shipment 104.

Each forklift 102 and shipment 104 may be provided with one or more wireless devices (e.g., forklift tags 204 and shipment tags 206) configured to transfer information. For example, the tags 204, 206 may include wireless devices configured to communicate via a wireless communications protocol, such as radio frequency identification (RFID), Bluetooth, Bluetooth Low Energy (BLE), Wi-Fi, near field communication (NFC), global positioning system (GPS), or other wireless communication protocols. It is noted that the terms "tag" and "wireless device" may be used interchangeably in this disclosure. The tags 204, 206 or other devices may be applied using adhesive to the forklift 102 or shipment 104, e.g., using a label that is embedded or printed with the tags 204, 206. Alternatively, the tags 204, 206 or other devices may be applied using other attachment methods. For example, when applying the tags 204 to object transport vehicles, such as the forklifts 102, the tags 204 may be applied using screws, rivets, welds, etc. For the forklift tag 204, the information may include identification information (e.g., a unique identifier or other information identifying the forklift 102). For the shipment tag 206, the information may include identification information (e.g., a unique identifier or other information identifying the shipment 104 and/or the contents within the shipment 104) or other tracking information (e.g., the origin, interim, or destination locations, or other information associated with the shipment 104). The unique identifier for the shipment 104 may include one or more alphanumeric characters and/or symbols assigned to the shipment 104, such as a progressive number (PRO number) for tracking the shipment 104 as known in the art.

Each forklift 102 may include one or more forklift tags 204. The forklift tag(s) 204 may be placed at a central location of the forklift 102, as shown in FIG. 2. Although FIG. 2 shows a single forklift tag 204, each forklift 102 may include a plurality of forklift tags 204, e.g., eight tags 204. Some of the tags 204 may be located closer to the top of the forklift 102 and some of the tags 204 may be located closer to the wheels of the forklift 102. Alternatively, the forklift 102 may include fewer than eight tags 204 (e.g., two or four tags) or more than eight tags 204. In some embodiments, some of the tags 204 may be located at a front portion of the forklift 102 (e.g., a portion of the forklift 102 close to the forks 202, such as the forklift mast) and some of the tags 204 may be located at a rear portion of the forklift 102. As described below, a controller may be configured to receive wireless signals from the plurality of the forklift tags 204 to identify a center point (CP) of the forklift 102, and the controller may use the center point of the forklift 102 to identify the location of the forklift 102 in the worksite 100.

Each forklift 102 may further include an onboard system configured to allow the operator to monitor various operations of the forklift 102. For example, each forklift 102 may include a control system 207 including a direction determining device 208, an operator display device 210, and a communication device 212.

The direction determining device 208 may be configured to determine an orientation or a direction of travel 214 of the forklift 102. For example, the direction determining device 208 may include a digital compass that may indicate the direction of travel 214 in a frame of reference defined by cardinal directions (e.g., north, south, east, west), intercardinal directions (e.g., northeast, northwest, southeast, southwest), and/or intermediate directions between the cardinal and intercardinal directions. In some embodiments, the direction determining device 208 may be configured to determine the direction of travel 214 relative to a coordinate system internal to the worksite 100. For example, a predetermined location in the worksite 100 may be designated with the coordinate point 0, 0 (i.e., an origin point) and the location and direction of travel of the forklift may be determined relative to the coordinate point 0, 0.

The operator display device 210 may include one or more monitors (e.g., a liquid crystal display (LCD), a cathode ray tube (CRT), a plasma display, a touch-screen, a portable hand-held device (e.g., a smartphone), a projection display device (e.g., a heads-up display), or any such display device known in the art) configured to actively and responsively display information to the operator of the forklift 102. The operator display device 210 may display images in response to signals provided by the control system of the forklift 102 and information received from a controller 304, as described below.

The communication device 212 may include any device configured to facilitate communications between the forklift 102 and the controller 304. For example, the communication device 212 may include an antenna, a transmitter, a receiver, and/or any other devices that enable the forklift 102 to wirelessly exchange information (e.g., signals from the control system 207, the direction determining device 208, etc.) with the controller 304 via a communication link. In some embodiments, the communication device 212 may be configured to communicate with the controller 304 via a wireless communication technology, such as Wi-Fi (e.g., an IEEE 802.11-based protocol), Bluetooth®, cellular technologies (i.e., 3G, 4G, 5G, 6G, or other 3GPP-related protocol), RFID, near field communication (NFC), global positioning system (GPS), or other wireless communication technologies.

Figure 3A:
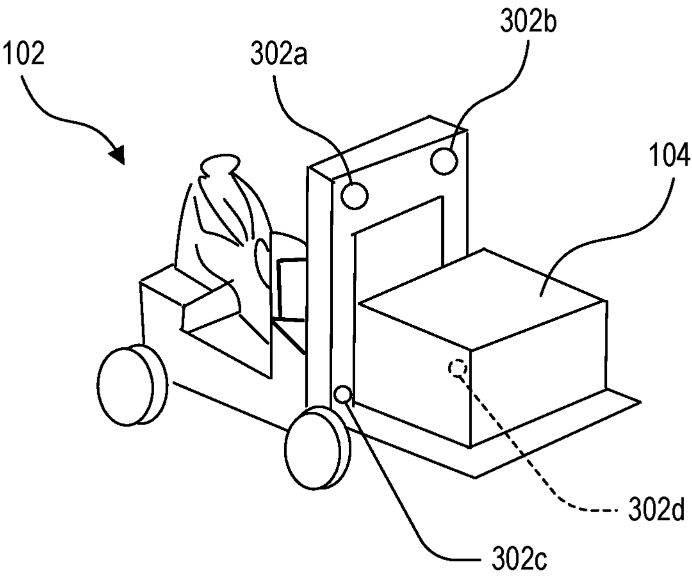
FIG. 3A is a front perspective view of a forklift carrying a shipment, consistent with the disclosed embodiments.

FIG. 3A is a front perspective view of a forklift 102 carrying a shipment 104, consistent with the disclosed embodiments. The forklift 102 includes four wireless devices 302*a*, 302*b*, 302*c*, 302*d* located on a front portion of the forklift 102 (e.g., on the forklift mast). It is noted that while the wireless devices 302*a*-302*d* are shown in FIG. 3A as circular, any sizes and shapes of the wireless devices 302*a*-302*d* are possible and contemplated within the scope of the present disclosure. Similarly, the number of wireless devices and the locations of the wireless devices on the front of the forklift 102 may vary. For example, if the object transport vehicle is a cart (and not a forklift 102), the possible locations of the wireless devices may be dictated by the size and shape of the object transport vehicle. The wireless devices 302*a*-302*d* may be used in addition to tag 204 as described above or may be used instead of tag 204. The wireless devices 302*a*-302*d* may be configured to transmit wireless signals to the reader 120 via a wireless communication technology, such as Wi-Fi (e.g., an IEEE 802.11-based protocol), Bluetooth® cellular technologies (i.e., 3G, 4G, 5G, 6G, or other 3GPP-related protocol), RFID, near field communication (NFC), global positioning system (GPS), or other wireless communication technologies.

The wireless devices 302*a*-302*d* may be configured to transmit wireless signals that may be received by reader 120 and indicate a current position of the object transport vehicle (e.g., forklift 102). In some embodiments, a controller (as will be described in connection with FIG. 6) may be configured to receive the position information from the reader 120 and calculate a front center point of the object transport vehicle. After calculating the front center point, the controller may be further configured to determine a location and a direction of travel of the object transport vehicle based on the front center point.

Figure 3B:
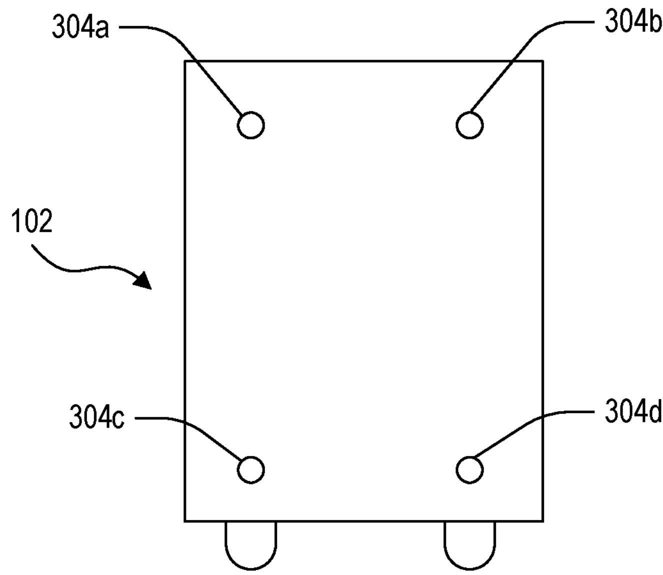
FIG. 3B is a rear view of a forklift, consistent with the disclosed embodiments.

FIG. 3B is a rear view of a forklift 102, consistent with the disclosed embodiments. The forklift 102 includes four wireless devices 304*a*, 304*b*, 304*c*, 304*d* located on a rear portion of the forklift 102. It is noted that while the wireless devices 304*a*-304*d* are shown in FIG. 3A as circular, any sizes and shapes of the wireless devices 304*a*-304*d* are possible and contemplated within the scope of the present disclosure. Similarly, the number of wireless devices and the locations of the wireless devices on the rear of the forklift 102 may vary. For example, if the object transport vehicle is a cart (and not a forklift 102), the possible locations of the wireless devices may be dictated by the size and shape of the object transport vehicle. The wireless devices 304*a*-304*d* may be used in addition to tag 204 as described above or may be used instead of tag 204. The wireless devices 304*a*-304*d* may be configured to transmit wireless signals to the reader 120 via a wireless communication technology, such as Wi-Fi (e.g., an IEEE 802.11-based protocol), Bluetooth®, cellular technologies (i.e., 3G, 4G, 5G, 6G, or other 3GPP-related protocol), RFID, near field communication (NFC), global positioning system (GPS), or other wireless communication technologies.

The wireless devices 304*a*-304*d* may be configured to transmit wireless signals that may be received by reader 120 and indicate the current position of the object transport vehicle (e.g., forklift 102). In some embodiments, the controller (as will be described in connection with FIG. 6) may be configured to receive the position information from the reader 120 and calculate a rear center point of the object transport vehicle. After calculating the rear center point, the controller may be further configured to determine the location and the direction of travel of the object transport vehicle based on the rear center point.

In some embodiments, the object transport vehicle may include wireless devices 302*a*-302*d* and wireless devices 304*a*-304*d*. In such an embodiment, the controller may be configured to calculate the front center point and the rear center point of the object transport vehicle. After calculating the front center point and the rear center point, the controller may be further configured to determine the location and the direction of travel of the object transport vehicle based on the front center point and the rear center point.

Figure 4:
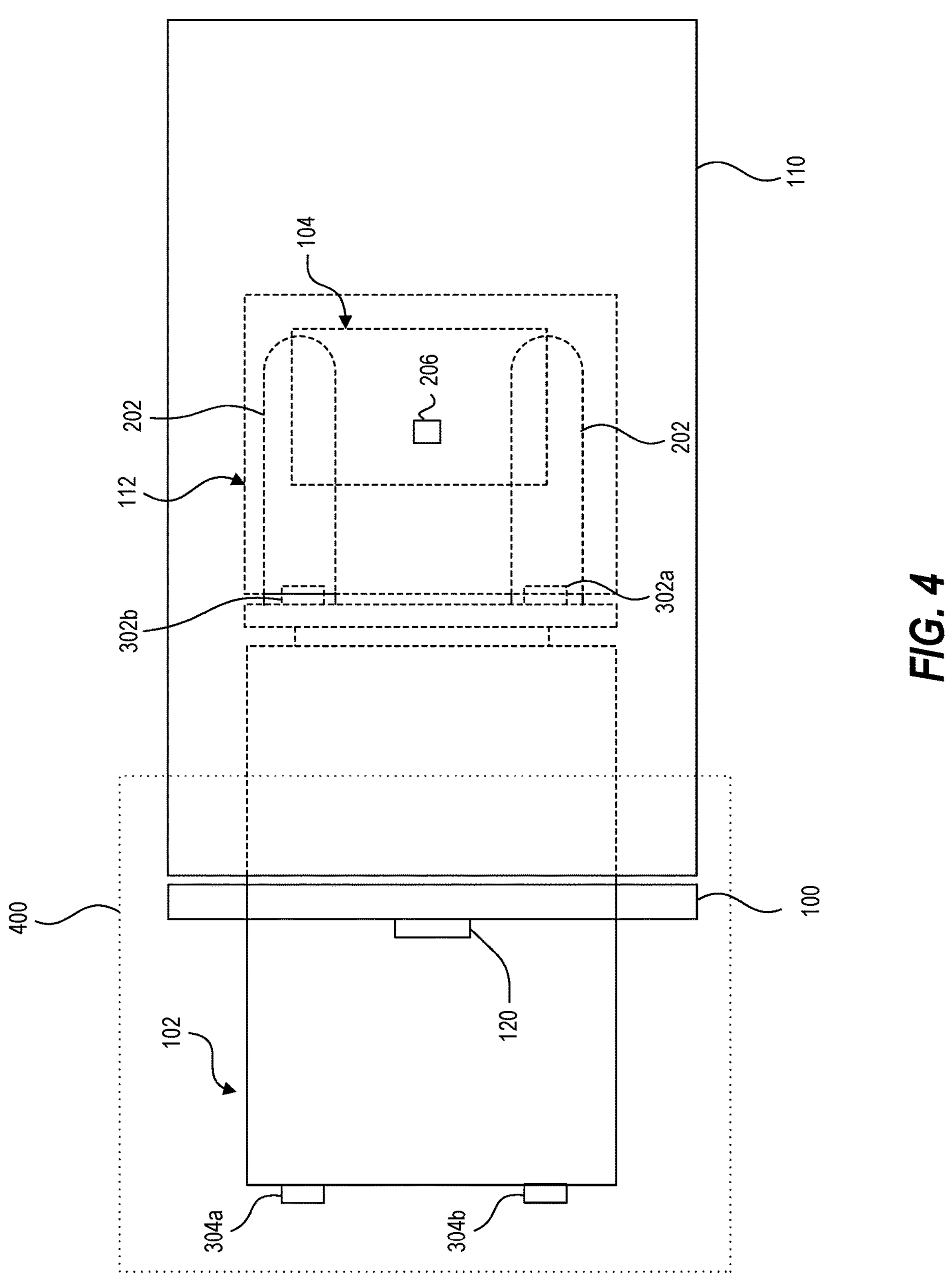
FIG. 4 is a schematic representation of a top view of a forklift entering a trailer while carrying a shipment on a pallet, consistent with the disclosed embodiments.

FIG. 4 is a schematic representation of a top view of a forklift 102 entering a trailer 110 while carrying a shipment

104 on a pallet 112, consistent with the disclosed embodiments. The forklift 102 includes wireless devices 302*a*-302*d* and wireless devices 304*a*-304*d*; in FIG. 4, only wireless devices 302*a*, 302*b*, 304*a*, and 304*b* are shown for clarity. A reader 120 may be located in worksite 100 over an entrance to the trailer 110. As described elsewhere in this disclosure, the worksite 100 may include multiple readers 120; only one reader 120 is shown in FIG. 4 for clarity.

As shown in FIG. 4, the forklift 102 is partially inside the trailer 110. The construction of the trailer 110 may interfere with the wireless devices 302*a*, 302*b* such that the reader 120 may not receive wireless signals from the wireless devices 302*a*, 302*b* but the reader 120 can receive wireless signals from wireless devices 304*a*, 304*b*. In such circumstances, the controller may be configured to calculate the only rear center point of the forklift 102 based on the wireless signals received from the wireless devices 304*a*, 304*b*. The controller may be further configured to determine the location and the direction of travel of the object transport vehicle based on the rear center point only. A "door zone" 400 may be defined in an area around the entrance to the trailer 110. In some embodiments, the door zone 400 may extend a predetermined distance around the entrance to the trailer 110 and into the worksite 100. For example, the door zone 400 shown in FIG. 4 is represented by the dotted line. In some embodiments, the door zone 400 may extend outside of the worksite 100 and into a physical trailer area (e.g., the dimensions of the door zone 400 may be larger than that illustrated in FIG. 4).

In some embodiments, prior to the controller calculating only the rear center point of the forklift 102, certain prerequisites may need to be met. If the forklift 102 is loading shipment 104 onto the trailer 110, it is desirable to maintain the association between the shipment 104 and the forklift 102 until the shipment 104 has been placed in the trailer 110. In some embodiments, the controller periodically determines whether the shipment 104 is associated with (i.e., being transported by) the forklift 102. However, as shown in FIG. 4, because the shipment tag 206 is located inside the trailer 110, the reader 120 may not be able to receive wireless signals from the shipment tag 206. Because the controller periodically (e.g., every 0.5 seconds, every 1.0 seconds, or other interval) determines whether a shipment is associated with the forklift 102, by not receiving wireless signals from the shipment tag 206 for one or more intervals, the controller may determine that the shipment 104 is not associated with the forklift 102, when it in fact still is associated with the forklift. In some embodiments, the prerequisites may include whether the forklift 102 is associated with the shipment 104. For example, the controller may determine that an association score of the shipment 104 exceeds a predetermined threshold, indicating that the shipment 104 is being carried by the forklift 102.

Figure 5A:
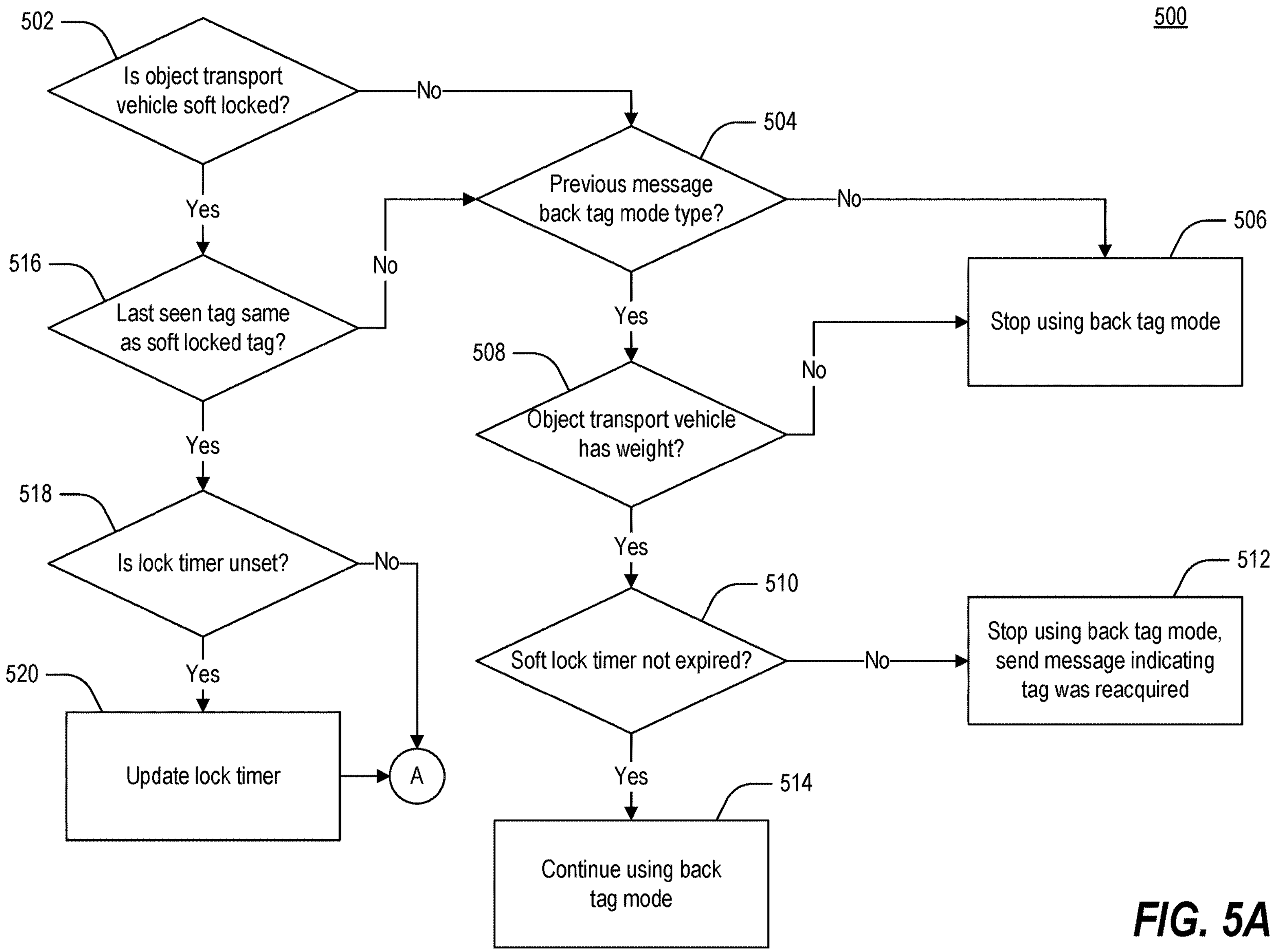
FIGS. 5A and 5B are a flowchart of a method for determining whether the object transport vehicle remains in a back tag mode, consistent with the disclosed embodiments.
Figure 5B:
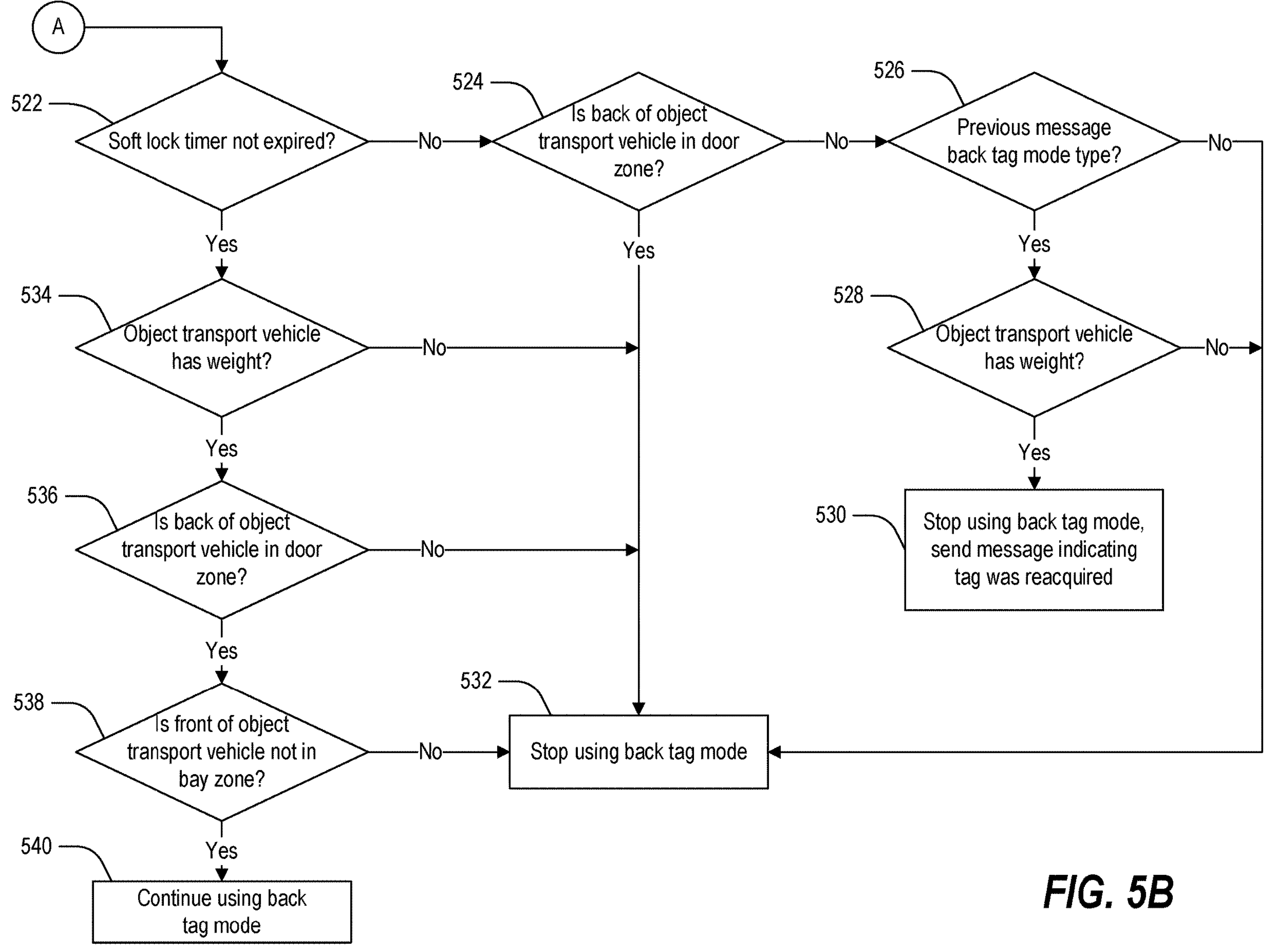

FIGS. 5A and 5B are a flowchart of a method 500 for determining whether the object transport vehicle remains in a back tag mode, consistent with the disclosed embodiments. In some embodiments, the method 500 may be performed by a controller 704 described in connection with FIG. 7, while in other embodiments the method 500 may be performed another device (including those not pictured in FIG. 5).

A determination is made whether the object transport vehicle is soft locked (step 502). As used herein, the term "soft locked" refers to a scenario in which the shipment tag's association score has exceeded a configurable threshold and the association between the object transport vehicle and the tag is considered confident.

If the object transport vehicle is not soft locked (step 502, "no" branch), then a determination is made whether the previous message (e.g., an immediately preceding message) received from the object transport vehicle was a back tag mode type (step 504). For example, the back tag message may include an indication for the type of event and a list of tags with association scores. It is noted that other message types are possible (e.g., association type, reacquisition type, and disassociation type), but for purposes of the method 500 only messages having the back tag message type are of interest.

If the previous message was not a back tag mode type message (step 504, "no" branch), then the object transport vehicle stops using the back tag mode (step 506). The location of the object transport vehicle may be determined using all wireless devices on the object transport vehicle (e.g., wireless devices 302*a*-302*d* and 304*a*-304*d*).

If the previous message was a back tag mode type message (step 504, "yes" branch), then a determination is made whether the object transport vehicle is carrying any weight (step 508). As described elsewhere in this disclosure, the object transport vehicle may include a weight sensor that is used to determine whether the object transport vehicle is carrying an object. For example, the forklift 102 may include weight sensors in the forks to determine whether the forklift 102 is carrying a shipment 104. If the object transport vehicle is not carrying any weight (step 508, "no" branch), then the object transport vehicle stops using the back tag mode (step 506). The location of the object transport vehicle may be determined using all wireless devices on the object transport vehicle (e.g., wireless devices 302*a*-302*d* and 304*a*-304*d*).

If the object transport vehicle is carrying weight (step 508, "yes" branch), then a determination is made whether the soft lock timer has not expired (i.e., whether the soft lock timer is still running; step 510). If the soft lock timer has expired (step 510, "no" branch), then the object transport vehicle stops using the back tag mode and sends a message indicating that the tag was reacquired (step 512). For example, the location of the object transport vehicle may be determined using all wireless devices on the object transport vehicle (e.g., wireless devices 302*a*-302*d* and 304*a*-304*d*).

If the soft lock timer has not expired (step 510, "yes" branch), then the object transport vehicle continues using the back tag mode (step 514).

If the object transport vehicle is soft locked (step 502, "yes" branch), then a determination is made whether the last seen tag (e.g., the tag that the reader 120 last received wireless signals from) is the same tag as the soft locked tag (step 516). As described above, the "soft lock" is a lock on the association between an object transport vehicle and a tag (e.g., wireless device 302*a*-302*d*, 304*a*-304*d*). This association works in both directions—an object transport vehicle may be soft locked to a particular tag, and a particular tag may be soft locked to an object transport vehicle. If the last seen tag is not the same tag as the soft locked tag (step 516, "no" branch), then the method 500 continues with step 504 as described above.

If the last seen tag is the same tag as the soft locked tag (step 516, "yes" branch), then a determination is made whether the soft lock timer is unset (step 518). If the soft lock timer is unset (step 518, "yes" branch), then the soft lock timer is updated (step 520). For example, the soft lock timer may be managed by setting a "last locked time" and then a number of seconds that should have elapsed before the timer is not used (e.g., a threshold). Updating the soft lock timer updates the soft lock timer to the current time. In some embodiments, the threshold may be set to five seconds. In other embodiments, the threshold may be configurable.

If the lock timer is unset (step 518, "no" branch) or after the lock timer is updated (step 520), a determination is made whether the soft lock timer is not expired (step 522). If the soft lock timer has expired (step 522, "no" branch), then a determination is made whether the back of the object transport vehicle is in a door zone (step 524). For example, the location of the object transport vehicle may be based on receiving signals from only the wireless devices 304*a*-304*d* (e.g., the wireless devices located on the back of the object transport vehicle). In some embodiments, the door zone may include the door zone 400 as described in connection with FIG. 4.

If the back of the object transport vehicle is not in a door zone (step 524, "no" branch), then a determination is made whether the previous message was a back tag mode type message (step 526). If the previous message was a back tag mode type message (step 526, "yes" branch), then a determination is made whether the object transport vehicle is carrying any weight (step 528). As described elsewhere in this disclosure, the object transport vehicle may include a weight sensor that is used to determine whether the object transport vehicle is carrying an object. For example, the forklift 102 may include weight sensors in the forks to determine whether the forklift 102 is carrying a shipment 104.

If the object transport vehicle is carrying weight (step 528, "yes" branch), then the object transport vehicle stops using the back tag mode and sends a message indicating that the tag was reacquired (step 530).

If the object transport vehicle is not carrying any weight (step 528, "no" branch), then the object transport vehicle stops using the back tag mode (step 532). The location of the object transport vehicle may be determined using all wireless devices on the object transport vehicle (e.g., wireless devices 302*a*-302*d* and 304*a*-304*d*).

If the soft lock timer has not expired (step 522, "yes" branch), then a determination is made whether the object transport vehicle is carrying any weight (step 534). As described elsewhere in this disclosure, the object transport vehicle may include a weight sensor that is used to determine whether the object transport vehicle is carrying an object. For example, the forklift 102 may include weight sensors in the forks to determine whether the forklift 102 is carrying a shipment 104. If the object transport vehicle is not carrying any weight (step 534, "no" branch), then the object transport vehicle stops using the back tag mode (step 532).

If the object transport vehicle is carrying weight (step 534, "yes" branch), then a determination is made whether the back of the object transport vehicle is in a door zone (step 536). For example, the location of the object transport vehicle may be based on receiving signals from only the wireless devices 304*a*-304*d* (e.g., the wireless devices located on the back of the object transport vehicle). In some embodiments, the door zone may include the door zone 400 as described in connection with FIG. 4.

If the back of the object transport vehicle is not in a door zone (step 536, "no" branch), then the object transport vehicle stops using the back tag mode (step 532). If the back of the object transport vehicle is in a door zone (step 536, "yes" branch), then a determination is made whether a front of the object transport vehicle is not located in a bay zone (step 538). For example, a bay zone may correspond to an area in the worksite 100 adjacent to a door (e.g., lane 106 shown in FIG. 1 may also be considered as a bay zone). For example, the location of the object transport vehicle may be based on receiving signals from the wireless devices 302*a*-302*d* (e.g., the wireless devices located on the front of the object transport vehicle).

If the front of the object transport vehicle is located in a bay zone (step 538, "no" branch), then the object transport vehicle stops using the back tag mode (step 532). If the front of the object transport vehicle is not located in a bay zone (step 538, "yes" branch), then the object transport vehicle continues using the back tag mode (step 540).

In some embodiments, the controller periodically calculates an association score for all shipments within a predetermined area around the object transport vehicle (e.g., within boundaries of a geofence around the object transport vehicle). The controller associates an object having a highest association score with the object transport vehicle (e.g., indicates that the object transport vehicle is carrying the object). If the controller is unable to receive information from reader 120 from a wireless device affixed to the object, then the controller may determine that the object is no longer associated with the object transport vehicle. For example, as shown in FIG. 4, if the reader 120 cannot receive wireless signals from the shipment tag 206, the controller may no longer associate the shipment 104 with the forklift 102.

To address this situation, if prior to entering the trailer 110, the controller is able to receive wireless signals from the wireless devices 302*a*, 302*b* and the shipment 104 is associated with the forklift 102, the controller may be configured to set the association score for the shipment 104 to an arbitrarily high value (e.g., to a value of 999 if the association score is in a range of 0-1000). By setting the association score to the arbitrarily high value, the controller may be configured to no longer rely on receiving information from the shipment tag 206 to determine the location of the shipment 104 and may only use information received from the wireless devices 304*a*, 304*b* (on the back of the forklift 102) to determine the location of the forklift 102.

When the controller uses the arbitrarily high score for the association score, it is less likely that the shipment 104 will "fall off the list" of shipments associated with the forklift 102. In some embodiments, the arbitrarily high score may function as a flag to a downstream system that indicates that the shipment should be "locked onto" until it can be read again. In some embodiments, this means that the scoring system may be temporarily bypassed for the object transport vehicle until the shipment tag can be read again. Once the shipment tag can be read again, a "reacquisition" message may be sent by the controller and the scoring system may be used again including calculating the score for the "reacquired" shipment tag. The controller may be configured to rank all read shipment tags from highest score to lowest score, with the highest score indicating that the shipment is associated with the forklift. By using the arbitrarily high score, the controller ensures that the shipment 104 is associated with the forklift 102 even though the controller does not receive any information from the shipment tag 206 for one or more intervals.

Figure 6:
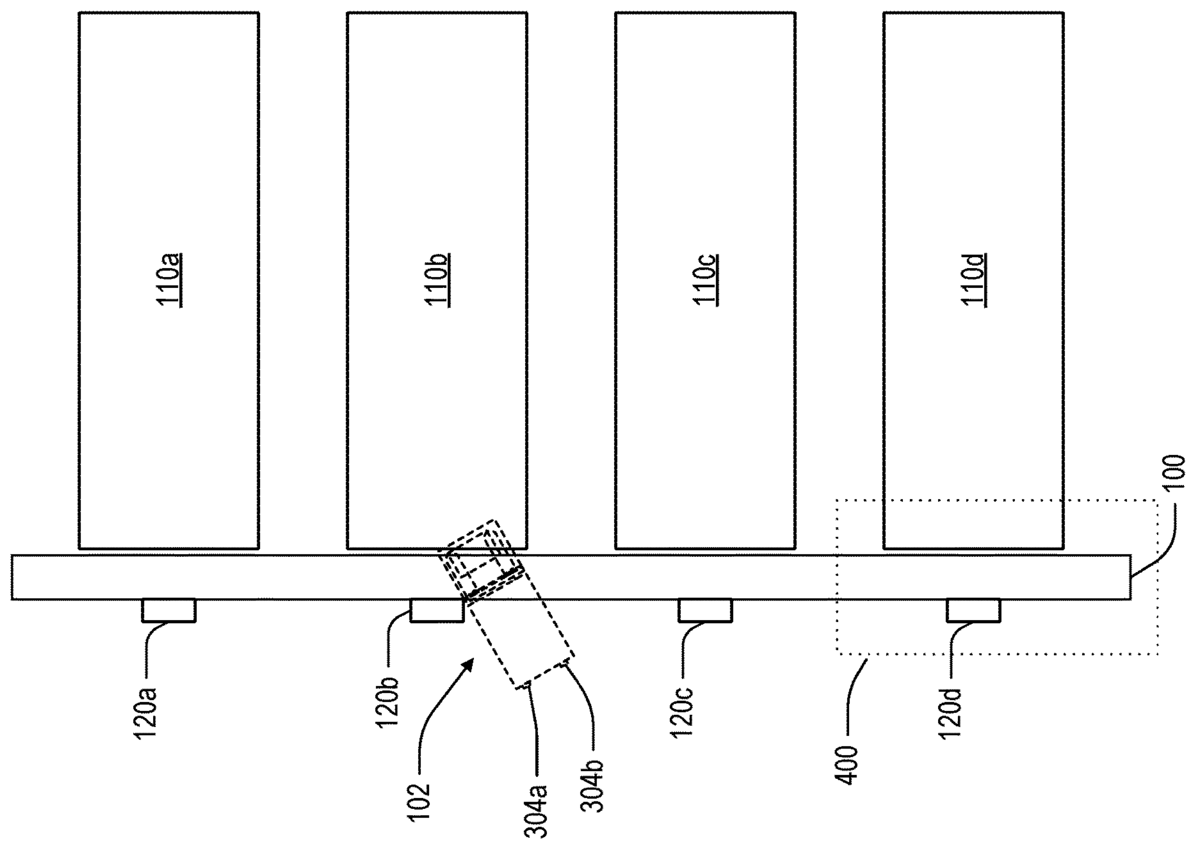
FIG. 6 is a schematic representation of a top view of a worksite, showing a forklift entering a trailer while carrying a shipment on a pallet, consistent with the disclosed embodiments.

FIG. 6 is a schematic representation of a top view of a worksite 100, showing a forklift 102 entering a trailer while carrying a shipment on a pallet, consistent with the disclosed embodiments. As shown in FIG. 6, the worksite 100 includes several trailers 110*a*, 110*b*, 110*c*, 110*d* and several readers 120*a*, 120*b*, 120*c*, 120*d*. It is noted that the worksite 100 may include any number of readers 120 and the location of the readers 120 may vary based on the particular configuration of the worksite 100. In the embodiment shown in FIG. 6, a reader 120 is positioned near an entrance to a trailer 110 from the worksite 100.

In FIG. 6, forklift 102 is shown partially inside trailer 110*b*. The reader 120*b* (positioned closest to the forklift 102) may not be able to receive wireless signals from the wireless devices on the front of the forklift 102 due to interference caused by the trailer 110*b* (i.e., the metal structure of the trailer 110*b* may interfere with the wireless signals from the wireless devices on the front of the forklift 102). In such circumstances, the reader 120*b* may only be able to receive wireless signals from the wireless devices 304*a*, 304*b* located on the rear of the forklift 102.

FIG. 6 illustrates a scenario in which the worksite 100 has several trailers 110 spaced relatively close together. Depending on the conditions in the worksite 100 (e.g., wireless signal interference), the reader 120*c* may receive a stronger wireless signal from the wireless device 304*b* than the reader 120*b*. For example, the forklift 102 may have needed to make a "tight turn" to enter the trailer 110*b* such that the rear of the forklift 102 is relatively closer to the reader 120*c* than to the reader 120*b* and the reader 120*c* receives stronger wireless signals from the wireless devices 304*a*, 304*b* than the reader 120*b*. Based on the stronger wireless signals received at the reader 120*c*, the controller may incorrectly determine that the forklift 102 is entering the trailer 110*c* instead of the trailer 110*b*. As the forklift 102 continues to enter the trailer 110*b*, the reader 120*b* may then begin to receive stronger wireless signals from the wireless devices 304*a*, 304*b* than the reader 120*c*.

To help avoid the "ping pong" effect of determining the location of the forklift 102 between the trailers 110*b* and 110*c*, the controller may be configured to implement a change counter. The change counter may be configured to count a number of intervals (i.e., time periods between location determinations) that the controller determines the location of the forklift 102 to be in a particular place. For example, if the controller determines that the forklift 102 is located in the trailer 110*b* for a predetermined number of "counts" (e.g., five consecutive times that the location is determined) and then determines (incorrectly, based on the relative received wireless signal strength) that the forklift 102 is located in the trailer 110*c*, the change counter may be used to override the most recent location determination. In some embodiments, the controller may be further configured to override the location determination if the change counter has reached a predetermined value.

Figure 7:
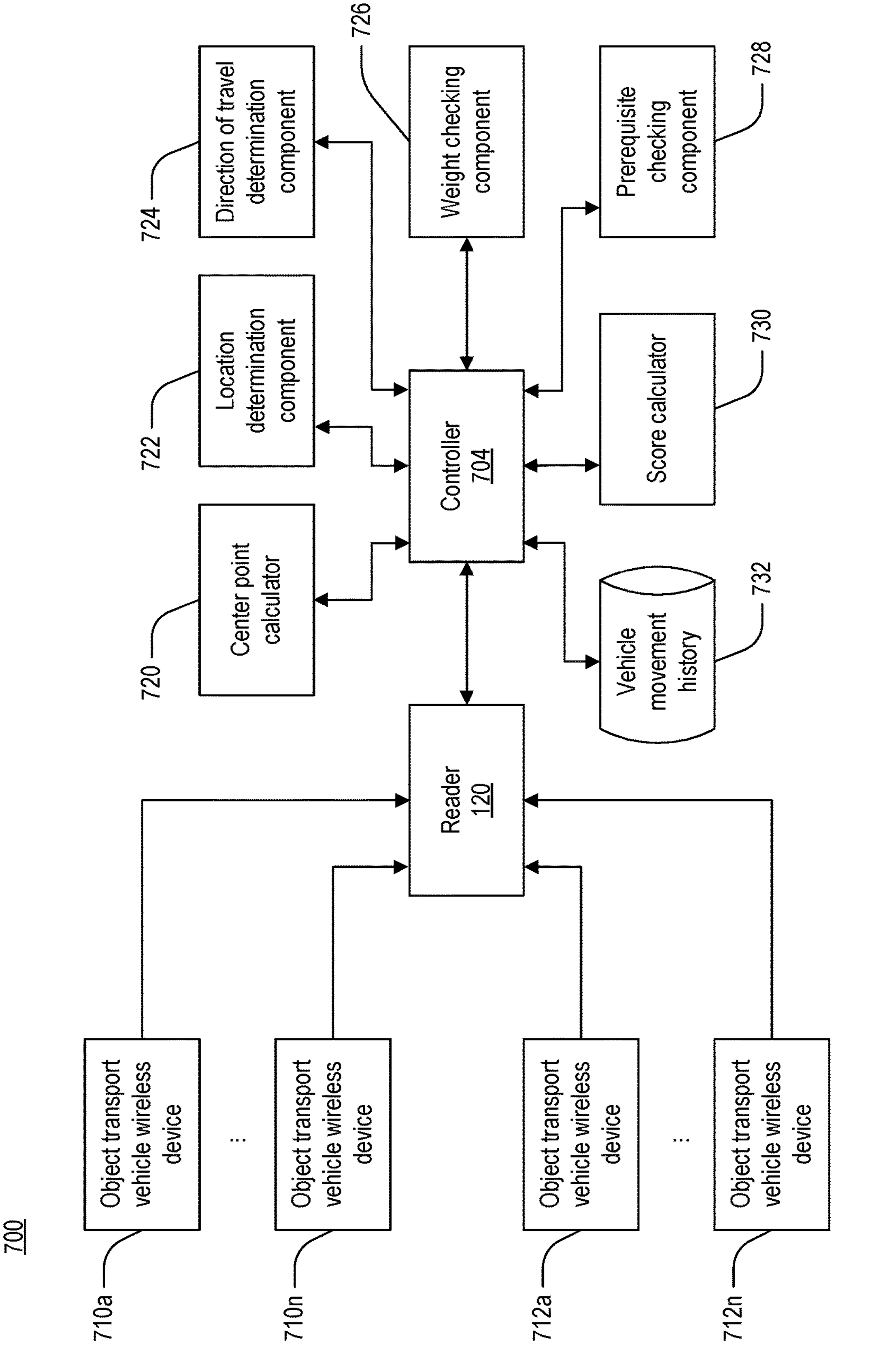
FIG. 7 is a block diagram of an object tracking system, consistent with the disclosed embodiments.

FIG. 7 is a block diagram of an object tracking system 700, consistent with the disclosed embodiments. The object tracking system 700 may include the reader 120 (e.g., the reader 120 described in connection with FIGS. 1, 4, and 6) and a controller 704. The reader 120 may be configured to receive wireless signals from wireless devices, such as forklift tags 204 and shipment tags 206. For example, the reader 120, the forklift tags 204, and the shipment tags 206 may be associated with a real time locating system (RTLS) as known in the art. In some embodiments, the system 700 may include one or more readers 120. The readers 120 may be configured to receive wireless signals in accordance with one or more wireless communication technologies. For example, the readers 120 may be configured to receive wireless signals according to any one or more of Wi-Fi (e.g., an IEEE 802.11-based protocol), Bluetooth®, cellular technologies (i.e., 3G, 4G, 5G, 6G, or other 3GPP-related protocol), RFID, near field communication (NFC), global positioning system (GPS), ultra-high frequency (UHF) radio waves, or other wireless communication technologies.

In the embodiment shown in FIG. 1, the readers 120 may be mounted to a wall at the worksite 100. Alternatively or in addition, the readers 120 may be mounted to a ceiling, and/or mounted or placed on a surface at or near the worksite 100. The number and location of the readers 120 may depend on the relative strength of the signals from the forklift tags 204 and the shipment tags 206. In some embodiments (e.g., when the tags 204, 206 supply relatively stronger signals), fewer readers 120 may be provided and may be located on or near the worksite 100, or remotely from the worksite 100. Alternatively (e.g., when the tags 204, 206 supply relatively weaker signals), an array of readers 120 may be provided and may be located on and/or near the worksite 100, e.g., at spaced-apart intervals along the ceiling and/or walls of the worksite 100.

The forklift tags 204 and the shipment tags 206 may be RFID tags, which may be active, semi-passive, or passive. Passive tags may be powered entirely by signals from the reader 120. Active and semi-passive tags may include a power source (e.g., a battery) to power its circuits. Semi-passive tags may also rely on the reader 120 to supply its power for certain functions, such as communicating with the reader 120. The readers 120 may use wireless non-contact radio-frequency electromagnetic fields to transfer information for the purpose of automatically identifying and tracking the forklifts 102 and the shipments 104 to which the tags 204, 206 are attached. For example, each reader 120 may periodically send signals in an area surrounding the reader 120 and receive responses from the tags 204, 206 that are located within the area surrounding the reader 120.

Referring back to FIG. 7, the reader 120 may be configured to receive wireless signals from object transport vehicle wireless devices 710*a*-710*n* (e.g., forklift tags 204) and wireless signals from object wireless devices 712*a*-712*n* (e.g., shipment tags 206). The reader 120 may be configured to communicate with the controller 704 via a wired connection or wireless connection. For example, the reader 120 may be configured to send information from the object transport vehicle wireless devices 710*a*-710*n* and the object wireless devices 712*a*-712*n* to controller 704. In some embodiments, the wireless signal received from each wireless device may include an identifier of the wireless device. The position of the wireless device on the object transport vehicle is known (e.g., may be recorded in a storage accessible by the controller 704) such that it may be determined (e.g., by the reader 120, the controller 704, or other device) which wireless device each wireless signal is received from.

The controller 704 may be configured to perform various operations based on the information received from the object transport vehicle wireless devices 710*a*-710*n* and the object wireless devices 712*a*-712*n*. The controller 704 may be configured to communicate with a center point calculator 720, a location determination component 722, a direction of travel determination component 724, a prerequisite checking component 726, a weight checking component 728, a score calculator 730, and an object transport vehicle movement history 732.

While shown in FIG. 7 as separate components, the components 720-732 may be operations performed by the controller 704 or may be components included in the controller 704. The components 720-732 may be implemented in hardware, software, or a combination thereof. In some embodiments, the controller 704 and/or the components 720-732 may be implemented as a processor, e.g., a central processing unit (CPU) with one or more processing cores, a graphics processing unit (GPU), an application-specific integrated circuit (ASIC), a digital signal processor (DSP), a field programmable gate array (FPGA), or other circuitry.

The center point calculator 720 may be configured to calculate a center point for an object transport vehicle based on wireless signals received from wireless devices associated with the object transport vehicle. For example, as shown in FIGS. 3A and 3B, an object transport vehicle (e.g., forklift 102) may include several wireless devices located on the front of the object transport vehicle (e.g., wireless devices 302*a*-302*d*) and several wireless devices located on the rear of the object transport vehicle (e.g., wireless devices 304*a*-304*d*). The signals from the wireless devices may be received by the reader 120 and passed to the controller 704 and the center point calculator 720. The center point calculator 720 may be configured to calculate a front center point for the object transport vehicle by averaging a location of the signals received from each of the wireless devices 302*a*-302*d*. The center point calculator 720 may be configured to calculate a rear center point for the object transport vehicle by averaging a location of the signals received from each of the wireless devices 304*a*-304*d*. The center point calculator 720 may be configured to average the front center point calculation and the rear center point calculation to determine a more precise location of the object transport vehicle, including a direction in which the object transport vehicle is oriented (e.g., which direction the front of the object transport vehicle is pointing in).

The location determination component 722 may be configured to determine a location of object transport vehicles and objects in the worksite 100 in real time or near-real time based on wireless signals received from the wireless devices on the object transport vehicle and on the objects in the worksite 100. The signals from the wireless devices may be received by the reader 120 and passed to the controller 704 and the location determination component 722. In some embodiments, the location determination component 722 may receive information from the center point calculator 720 (via controller 704) to determine the location of the object transport vehicle based on the calculated center point of the object transport vehicle. In some embodiments, the location of an object may be indicated by a point on an x, y coordinate plane with no assumed size for the object. In some embodiments, the location of the object may be determined to be within a variable radius of the determined location based on the wireless signals received from the wireless devices. For example, the variable radius may be approximately three feet or one meter.

In some embodiments, the location determination component 722 may receive wireless signals from the wireless devices 302*a*-302*d*, 304*a*-304*d* and calculate an average position of each of the eight wireless devices to determine a center point (CP) of the object transport vehicle, in a similar manner as described in connection with FIG. 2. In such an embodiment, the center point calculator 720 may be an optional component or may not provide information to the location determination component 722.

The direction of travel determination component 724 may be configured to determine a direction of travel of the object transport vehicle. In some embodiments, the direction of travel determination component 724 may receive the front center point calculation and the rear center point calculation from the center point calculator 720 (via controller 704) and determine the direction of travel of the object transport vehicle based on the front center point and the rear center point. In some embodiments, the direction of travel determination component 724 may also receive the current location of the object transport vehicle from the location determination component 722 (via controller 704) and may use the front center point, the rear center point, and the location of the object transport vehicle to determine the direction of travel of the object transport vehicle in the worksite 100.

The weight checking component 726 may be configured to determine whether the object transport vehicle is transporting an object by determining whether the object transport vehicle is carrying a weight higher than a predetermined threshold weight (i.e., to determine that the object transport vehicle is not "empty"). For example, if the object transport vehicle is a forklift, each of the forks may include a weight sensor or weight determining device to determine whether the forks are carrying any weight. To ensure that the forklift is carrying a shipment (e.g., shipment 104), the predetermined threshold weight may need to be exceeded.

The prerequisite checking component 728 may be configured to determine whether all prerequisites for determining the location of the object transport vehicle using only wireless signals received from wireless devices attached to the rear of the object transport vehicle (e.g., wireless devices 304*a*-304*d*) have been met. For example, the prerequisites may include (1) that the object transport vehicle is associated with an object (e.g., the forklift 102 is carrying the shipment 104), (2) the association score for the object exceeds a predetermined threshold (i.e., that it can be determined with some certainty that the object transport vehicle is carrying the object), and (3) the object transport vehicle has traveled a predetermined distance. For example, the predetermined distance may be a distance greater than a predetermined number of sections of the worksite 100. In such circumstances, it can be determined that the object transport vehicle is carrying an object to be loaded onto a trailer.

The score calculator 730 may be configured to calculate a score for objects (e.g., shipments 104) in the worksite 100. For example, the score calculator 730 may calculate a score for each object based on the location of the object relative to the object transport vehicle and/or to the boundaries of a geofence that surrounds the object transport vehicle (e.g., whether the object is located fully inside the geofence, partially inside the geofence, or fully outside the geofence). In some embodiments, a size and shape of the geofence may be defined in a configuration file and may be retrieved from the configuration file to generate the geofence. In some embodiments, the geofence may be projected relative to a center point of the object transport vehicle or relative to a center point of the front mast of the object transport vehicle (e.g., a forklift). For example, the center point of the front mast of the object transport vehicle may be determined by calculating an average location of the wireless devices attached to the front mast of the object transport vehicle.

In some embodiments, the score may be calculated as follows. All wireless devices (e.g., tags) within a configurable proximity to a center of the object transport vehicle (e.g., forklift) are identified. This is performed to narrow the scope of the number of wireless devices that are to be examined. All the geofences for the object transport vehicle are sorted according to a weight assigned to the geofence, from highest weight to lowest weight. For each wireless device on a list of nearby wireless devices, the process iterates through each geofence to determine if the wireless device is within the bounds of the geofence. As soon as a geofence is found where this condition is true (i.e., the wireless device is inside the geofence), the weight for that geofence is added to the score of the wireless device. Since the geofences are sorted by their weights, and the weights are assigned by nearness to the front forks (assuming that the object transport vehicle is a forklift), this means that only the highest priority geofence and its weight is applied. The next wireless device is then processed according to the same rules, until all wireless devices in the nearby wireless device list have had their scores adjusted.

Once all wireless devices have been evaluated, in-fence averaging is performed over the list of wireless devices to further adjust scores depending on their consistency. A time window having a predetermined length (e.g., between 1-5 seconds) may be used to evaluate the shipments. Each shipment is periodically "read" within the time window, for example, every 0.5 seconds. A percentage of the "reads" during the time window that the shipment spends within the geofence is calculated. For example, if the time window is 5 seconds and each wireless device is "read" every 0.5 seconds, there will be a total of 10 "reads" during the time window. Based on the percentage of the "reads" that the shipment spends within the geofence, each shipment in the list is compared to its neighbors in the list. During this comparison, if a difference between the calculated percentages spent inside the geofence exceeds a predetermined threshold (e.g., if one shipment has 10% or more "reads" inside the geofence than its neighboring shipments), the scores of the shipments involved in the comparison may be adjusted by a predetermined amount. For example, the score of the shipment that has spent the most "reads" inside the geofence may have its score increased by five points. It is noted that other types of score increases are possible, such as a different number of points or a predetermined percentage score increase (e.g., a 5% increase). The scores for the shipments are then sorted according to the now-adjusted score.

The score may be calculated based on any applicable relative scoring scale, e.g., 0 to 100, 0.0 to 1.0, etc. In some embodiments, the closer a shipment is to the forks 202 of the forklift 102, the higher the score assigned to the shipment. In such an embodiment, the controller 704 may use the score to determine a likelihood that a particular shipment is being carried by the forklift 102, with the highest score indicating a higher likelihood that the shipment is loaded on the forks 202 of the forklift 102. In other embodiments, the object transport vehicle may be a vehicle other than a forklift and a higher score may be based on proximity of the shipment to a center point or other reference point of the object transport vehicle. For example, if the object transport vehicle is a flatbed cart, a higher score may be based on proximity of the shipment to a center point of the cart. In some embodiments, a higher score may indicate that the object transport vehicle is transporting the object (i.e., shipment). In some embodiments, any objects that are detected but located outside the geofence may not be considered for scoring or may be considered for scoring but assigned an arbitrarily low score (e.g., assigned a "0" or a "1" on a scale of 0 to 100).

In some embodiments, an in-memory database may be used within the score calculator 730 to store the scores. In some embodiments, the score calculator 730 may be configured to output a list of scores. In some embodiments, the list of scores may be sent to the object transport vehicle which may then further process the list to determine which object is being carried by the object transport vehicle. Referring to FIG. 2, the control system 207 of the forklift 102 may receive the list of scores and process the list to determine which shipment on the list is being carried by the forklift 102. The shipment being carried by the forklift 102 may be displayed on the operator display device 210. In some embodiments, the controller 704 may be further configured to process the list of scores to determine which object is being carried by the object transport vehicle. Referring to FIG. 2, the controller 704 may send a message to the forklift 102 (received via the communication device 212) to display the shipment being carried on the forklift 102 on the operator display device 210.

Referring back to FIG. 7, the object transport vehicle movement history 732 may be configured to store the movement history of the object transport vehicle in the worksite 100. In some embodiments, the prerequisite checking component 728 may use the object transport vehicle movement history to determine whether the object transport vehicle has traveled the predetermined distance.

Figure 8:
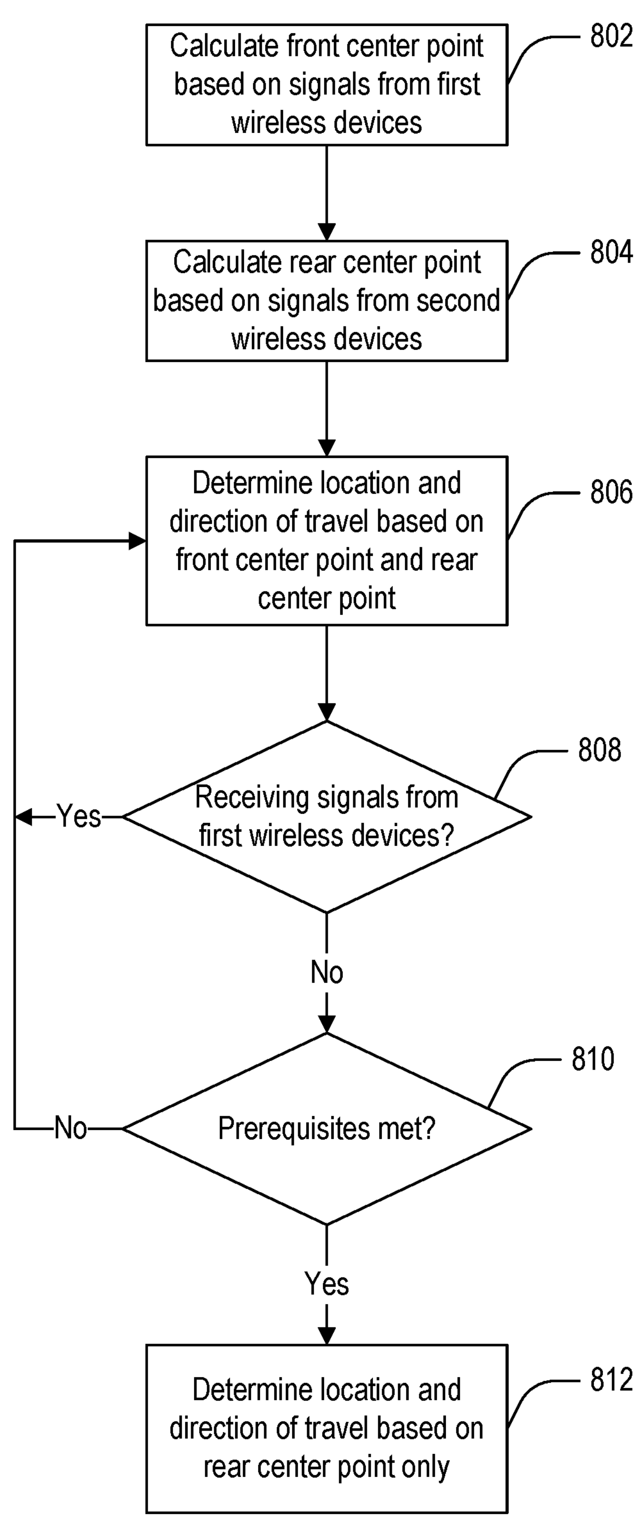
FIG. 8 is a flowchart of a method for determining a location and direction of travel of an object transport vehicle, consistent with the disclosed embodiments.

FIG. 8 is a flowchart of a method 800 for determining a location and direction of travel of an object transport vehicle, consistent with the disclosed embodiments. In some embodiments, the method 800 may be performed by the controller 704 described in connection with FIG. 7, while in other embodiments the method 800 may be performed another device (including those not pictured in FIG. 7).

A front center point of the object transport vehicle is calculated based on wireless signals received from first wireless devices on the object transport vehicle (step 802). For example, the first wireless devices may include wireless devices 302*a*-302*d* as described in connection with FIG. 3A. In some embodiments, the front center point may be calculated by center point calculator 720 or controller 704 as described in connection with FIG. 7.

A rear center point of the object transport vehicle is calculated based on wireless signals received from second wireless devices on the object transport vehicle (step 804). For example, the second wireless devices may include wireless devices 304*a*-304*d* as described in connection with FIG. 3B. In some embodiments, the rear center point may be calculated by center point calculator 720 or controller 704 as described in connection with FIG. 7.

A location and direction of travel of the object transport vehicle is determined based on the calculated front center point and the calculated rear center point (step 806). In some embodiments, the location and direction of travel may be determined based on an average of the front center point and the rear center point of the object transport vehicle. In some embodiments, the location of the object transport vehicle may be determined by the location determination component 722 or the controller 704 as described in connection with FIG. 7. In some embodiments, the direction of travel of the object transport vehicle may be determined by the direction of travel determination component 724 or the controller 704 as described in connection with FIG. 7. In some embodiments, both the location and the direction of travel of the object transport vehicle may be determined by the location determination component 722 or the controller 704 as described in connection with FIG. 7.

A determination is made whether wireless signals are currently being received from the first wireless devices (step 808). As described in connection with FIG. 6, there may be situations in which the front of the object transport vehicle is in a trailer and the wireless signals from the first wireless devices may be interfered with by the trailer such that a reader cannot receive wireless signals from the first wireless devices. If wireless signals from the first wireless devices can be received (step 808, "yes" branch), then the method 800 returns to step 806 to calculate the location and direction of travel of the object transport vehicle at a later point in time.

If wireless signals from the first wireless devices cannot be received (step 808, "no" branch), then a determination is made whether all prerequisites for determining the location of the object transport vehicle using only wireless signals received from wireless devices attached to the rear of the object transport vehicle (e.g., wireless devices 304*a*-304*d*) have been met (step 810). For example, if the object transport vehicle is carrying a shipment and the object transport vehicle has traveled more than a predetermined distance in the worksite 100, then it may be determined that the object transport vehicle is moving to load the shipment into a trailer. As described in connection with FIG. 7, the prerequisites may include (1) that the object transport vehicle is associated with an object, (2) the association score for the object exceeds a predetermined threshold, and (3) the object transport vehicle has traveled a predetermined distance. If all prerequisites have not been met (step 810, "no" branch), then the method 800 returns to step 806 to calculate the location and direction of travel of the object transport vehicle at a later point in time.

If all prerequisites have been met (step 810, "yes" branch), then the location and direction of travel of the object transport vehicle is determined based on the rear center point of the object transport vehicle only (step 812). For example, the location and direction of travel of the object transport vehicle may be determined using only the wireless signals received from the second wireless devices.

Figure 9:
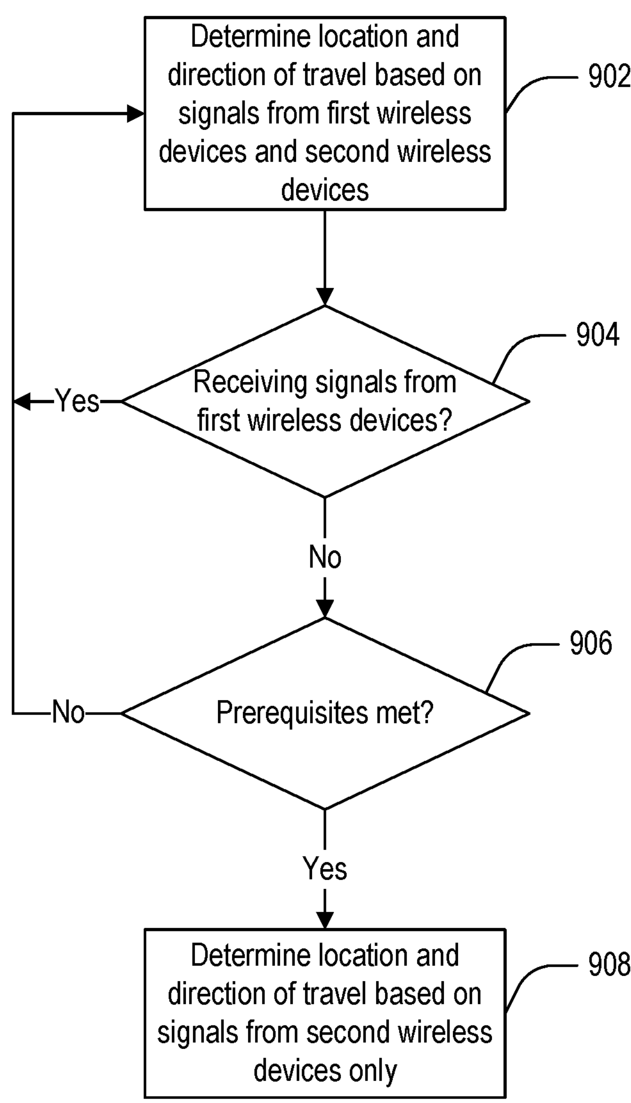
FIG. 9 is a flowchart of another method for determining a location and direction of travel of an object transport vehicle, consistent with the disclosed embodiments.

FIG. 9 is a flowchart of a method 900 for determining a location and direction of travel of an object transport vehicle, consistent with the disclosed embodiments. In some embodiments, the method 900 may be performed by the controller 704 described in connection with FIG. 7, while in other embodiments the method 900 may be performed another device (including those not pictured in FIG. 7).

A location and direction of travel of the object transport vehicle is determined based on wireless signals received from first wireless devices and second wireless devices attached to the object transport vehicle (step 902). In some embodiments, the first wireless devices may be located on a front of the object transport vehicle (similar to that shown and described in connection with FIG. 3A) and the second wireless devices may be located on a rear of the object transport vehicle (similar to that shown and described in connection with FIG. 3B). In some embodiments, the location of the object transport vehicle may be determined by the location determination component 722 or the controller 704 as described in connection with FIG. 7. In some embodiments, the direction of travel of the object transport vehicle may be determined by the direction of travel determination component 724 or the controller 704 as described in connection with FIG. 7. In some embodiments, both the location and the direction of travel of the object transport vehicle may be determined by the location determination component 722 or the controller 704 as described in connection with FIG. 7.

A determination is made whether wireless signals are currently being received from the first wireless devices (step 904). As described in connection with FIG. 6, there may be situations in which the front of the object transport vehicle is in a trailer and the wireless signals from the first wireless devices may be interfered with by the trailer such that a reader cannot receive wireless signals from the first wireless devices. If wireless signals from the first wireless devices can be received (step 904, "yes" branch), then the method 900 returns to step 902 to calculate the location and direction of travel of the object transport vehicle at a later point in time.

If wireless signals from the first wireless devices cannot be received (step 904, "no" branch), then a determination is made whether all prerequisites for determining the location of the object transport vehicle using only wireless signals received from wireless devices attached to the rear of the object transport vehicle (e.g., wireless devices 304*a*-304*d*) have been met (step 906). For example, if the object transport vehicle is carrying a shipment and the object transport vehicle has traveled more than a predetermined distance in the worksite 100, then it may be determined that the object transport vehicle is moving to load the shipment into a trailer. As described in connection with FIG. 7, the prerequisites may include (1) that the object transport vehicle is associated with an object, (2) the association score for the object exceeds a predetermined threshold, and (3) the object transport vehicle has traveled a predetermined distance. If all prerequisites have not been met (step 906, "no" branch), then the method 900 returns to step 902 to calculate the location and direction of travel of the object transport vehicle at a later point in time.

If all prerequisites have been met (step 906, "yes" branch), then the location and direction of travel of the object transport vehicle is determined based on wireless signals received from the second wireless devices only (step 908).

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, Go, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations, and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. Disclosed embodiments may, moreover, include any one of the features in the claims, alone or in combination with one or more other feature in the claims, whether implemented as a method, by at least one processor, and/or stored as executable instructions on non-transitory computer readable media.

It is intended, therefore, that the specification and examples be considered as illustrative only, with a true scope being indicated by the following claims and their full scope of equivalents.

What is claimed is:

1. An object transport vehicle tracking system, comprising:
a first plurality of wireless devices affixed to a front portion of the object transport vehicle;
a second plurality of wireless devices affixed to a rear portion of the object transport vehicle;
a controller configured to:
calculate a front center point of the object transport vehicle based on first signals received from each of the first plurality of wireless devices;
calculate a rear center point of the object transport vehicle based on second signals received from each of the second plurality of wireless devices;
determine a location and direction of travel of the object transport vehicle based on the front center point and the rear center point; and
determine the location and direction of travel of the object transport vehicle based only on the rear center point, on a condition that:
the first signals from the first plurality of wireless devices are not received; and
prerequisites are met.

2. The object transport vehicle tracking system of claim 1, wherein the prerequisites include:
determining whether the object transport vehicle is carrying an object based on an association score of the object; and
determining whether the association score of the object exceeds a threshold.

3. The object transport vehicle tracking system of claim 2, wherein the prerequisites further include:
determining whether the object transport vehicle has traveled a predetermined distance.

4. The object transport vehicle tracking system of claim 1, wherein the prerequisites are received as history information of the object tracking vehicle.

5. The object transport vehicle tracking system of claim 1, wherein:
the prerequisites are received as a data stream relating to the object tracking vehicle; and
the data stream is examined to determine whether the prerequisites are met.

6. The object transport vehicle tracking system of claim 1, wherein the controller is further configured to:
determine whether the object transport vehicle is carrying an object based on an association score of the object;
on a condition that the first signals from the first plurality of wireless devices are not received, setting the association score of the object to a predetermined value, whereby the object stays associated with the object transport vehicle.

7. The object transport vehicle tracking system of claim 1, wherein the controller is further configured to:
periodically determine an association score of each of a plurality of objects in an area near the object transport vehicle;
determine whether the object transport vehicle is carrying one of the plurality of objects based on the association score and the association score for the one object:
exceeds a threshold; and
is a highest association score among the association scores of each of the plurality of objects; and
on a condition that the first signals from the first plurality of wireless devices are not received, setting the association score of the one object to a predetermined value, whereby:
the one object has the highest association score; and
the one object stays associated with the object transport vehicle.

8. The object transport vehicle tracking system of claim 1, wherein:
the controller includes a counter configured to count a number of times that the location determined only by the rear center point indicates that the object transport vehicle is in a same location; and
on a condition that a different location of the object transport vehicle is determined only by the rear center point before a counter threshold is reached, changing the location of the object transport vehicle to the different location.

9. The object transport vehicle tracking system of claim 1, wherein the first plurality of wireless devices includes four wireless devices.

10. The object transport vehicle tracking system of claim 1, wherein the second plurality of wireless devices includes four wireless devices.

11. The object transport vehicle tracking system of claim 1, wherein each of the plurality of first wireless devices is a position sensor configured to generate the first signal.

12. The object transport vehicle tracking system of claim 1, wherein each of the plurality of second wireless devices is a position sensor configured to generate the second signal.

13. The object transport vehicle tracking system of claim 1, wherein the controller is configured to calculate the front center point of the object tracking vehicle by averaging a location determined from each of the first signals.

14. The object transport vehicle tracking system of claim 1, wherein the controller is configured to calculate the rear center point of the object tracking vehicle by averaging a location determined from each of the second signals.

15. A method for tracking an object transport vehicle, comprising:
calculating a front center point of the object transport vehicle based on first signals received from each of a first plurality of wireless devices, each of the first plurality of wireless devices affixed to a front portion of the object transport vehicle;
calculating a rear center point of the object transport vehicle based on second signals received from each of a second plurality of wireless devices, each of the second plurality of wireless devices affixed to a rear portion of the object transport vehicle;
determining a location and direction of travel of the object transport vehicle based on the front center point and the rear center point; and
determining the location and direction of travel of the object transport vehicle based only on the rear center point, on a condition that:
the first signals from the first plurality of wireless devices are not received; and
prerequisites are met.

16. The method of claim 15, wherein the prerequisites include:
determining whether the object transport vehicle is carrying an object based on an association score of the object; and
determining whether the association score of the object exceeds a threshold.

17. The method of claim 16, wherein the prerequisites further include:

determining whether the object transport vehicle has traveled a predetermined distance.

18. The method of claim 15, wherein:

the prerequisites are received as a data stream relating to the object tracking vehicle; and determining whether the prerequisites are met includes examining the data stream.

19. An object transport vehicle tracking system, comprising:

a first plurality of wireless devices affixed to a front portion of the object transport vehicle;

a second plurality of wireless devices affixed to a rear portion of the object transport vehicle;

a controller configured to:

determine a location and direction of travel of the object transport vehicle based on first signals received from each of the first plurality of wireless devices and second signals received from each of the second plurality of wireless devices; and determine the location and direction of travel of the object transport vehicle based only on the second signals from the second plurality of wireless devices, on a condition that:

the first signals from the first plurality of wireless devices are not received; and prerequisites are met.

20. The object transport vehicle tracking system of claim 19, wherein the prerequisites include:

determining whether the object transport vehicle is carrying an object based on an association score of the object;

determining whether the association score of the object exceeds a threshold; and determining whether the object transport vehicle has traveled a predetermined distance.

* * * * *